(12) United States Patent
Ivanov et al.

(10) Patent No.: US 11,941,418 B1
(45) Date of Patent: *Mar. 26, 2024

(54) ENHANCING USER EXPERIENCE ON MOVING AND RESIZING WINDOWS OF REMOTE APPLICATIONS

(71) Applicant: PARALLELS INTERNATIONAL GmbH, Schaffhausen (CH)

(72) Inventors: Sergei Ivanov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,239

(22) Filed: Oct. 20, 2022

Related U.S. Application Data

(63) Continuation of application No. 16/355,903, filed on Mar. 18, 2019, now Pat. No. 11,507,398.

(51) Int. Cl.
  *G06F 3/048* (2013.01)
  *G06F 3/04845* (2022.01)
  *G06F 9/451* (2018.01)
(52) U.S. Cl.
  CPC .......... *G06F 9/452* (2018.02); *G06F 3/04845* (2013.01)

(58) Field of Classification Search
  CPC .............................. G06F 9/452; G06F 3/04845
  See application file for complete search history.

(56) References Cited

U.S. PATENT DOCUMENTS

| | | | |
|---|---|---|---|
| 8,856,681 | B2 | 10/2014 | Rodden et al. |
| 9,530,184 | B1 | 12/2016 | Friedman et al. |
| 9,946,431 | B2 | 4/2018 | Park-Ekecs et al. |
| 11,153,364 | B1 | 10/2021 | Portelli et al. |
| 2010/0175021 | A1 | 7/2010 | Ferrara |
| 2011/0083102 | A1 | 4/2011 | Adachi |
| 2012/0311457 | A1 | 12/2012 | O'Gorman |
| 2014/0026057 | A1 | 1/2014 | Kimpton et al. |
| 2014/0033119 | A1 | 1/2014 | Kim et al. |
| 2015/0106731 | A1 | 4/2015 | Matas et al. |
| 2015/0163281 | A1 | 6/2015 | Liu et al. |
| 2016/0044088 | A1 | 2/2016 | Momchilov et al. |

*Primary Examiner* — Mahelet Shiberou
(74) *Attorney, Agent, or Firm* — Rosenberg, Klein & Lee

(57) ABSTRACT

Disclosed are systems and methods for providing improved rendering of graphical user interfaces for remote applications executing within remote sessions. A remote session client that renders the graphical user interface (GUI) for a remote application is configured to detect certain mouse events that would trigger window move events. In doing so, the remote session client may handle rendering the window GUI locally rather than wait for window move events from the remote application. The remote session client may be further configured to predict using calculated resize patterns how the window content image changes while the remote application's window is being resized.

10 Claims, 10 Drawing Sheets

ENHANCING USER EXPERIENCE ON MOVING AND RESIZING WINDOWS OF REMOTE APPLICATIONS

CROSS-REFERENCE TO RELATED APPLICATIONS

This patent application claims the benefit of priority from U.S. patent application Ser. No. 16/355,903 filed Mar. 18, 2019; the entire contents of which are incorporated herein by reference.

FIELD OF THE INVENTION

The present disclosure relates generally to the field of remote computing, more specifically, to systems and methods of enhancing user experience during moving and resizing of windows of remote applications.

BACKGROUND

Remote desktop technologies (also referred to as "remote access") allow a local user interacting with a local computing device to control and view a remote desktop session originating from a remote computer or host. A remote desktop client application running on the client computer and a remote desktop server application running on the server computer together facilitate "remoting" a desktop session. The remote desktop client application receives user input, such as keyboard and mouse input, and converts the input into a network-compatible representation to be transmitted to the server computer. The remote desktop server application running on the server computer receives the network-compatible representation of the user input, and converts this representation into actual input messages. The input messages are then sent to the server computer's message queue and processed as if the input was generated at the server computer. Therefore, applications running on the server computer respond to the input as if the input was generated at the server computer.

However, the latency between a local computing device and the remote host can cause poor user experiences during certain dynamic interactions with the remote desktop session. For example, a user moving windows within the remote desktop session might experience stuttered motion or graphical artifacts due to the delay in receiving updates from the remote sessions. This degradation of user experience is particularly pronounced in mixed (e.g., seamlessly integrated) local and remote environments, where the user experience of moving the windows of the remote application is perceptively worse than the user experience of moving the window of a locally executing application.

SUMMARY

Thus, a system and method is disclosed herein for generating a graphical user interface for a remote application, and, more particularly, for generating improved windows-related operations with a graphical user interface of a remote application.

One aspect of the present disclosure provides a method of generating a graphical user interface of a remote application. The method includes generating a window graphical user interface (GUI) for a remote application executing within a remote session established between a client device and a remote server. The window GUI of the remote application executing on the remote server is rendered for display within a local GUI by the client device. The method further includes, detecting, by the client device, a first mouse input event indicating a drag input within the window GUI of the remote application, and determining whether the first mouse input event is associated with a window move event for the remote application. Responsive to determining that the first mouse input event is associated with a window move event for the remote application, the local GUI is modified to display a locally cached copy of the window GUI in an updated location in the local GUI in response to subsequent mouse input events indicating drag inputs for the window GUI of the remote application.

In another aspect, the method further includes, in response to detecting a second mouse input event indicating a mouse button release, transmitting a final position of the window GUI to the remote application executing on the remote server; receiving a window move event from the remote application comprising an updated window image; and redrawing contents of the window GUI with the updated window image.

In another aspect, the method further includes, in response to detecting the second mouse input event indicating the mouse button release, re-enabling windows updating of the window GUI.

In another aspect, the determining whether the first mouse input event is associated with a window move event for the remote application further includes: disabling display updating of the window GUI by freezing contents of the window GUI; sending the first mouse input event to the remote application using the remote session; determining that the first mouse input event is associated with a window move event for the remote application based on receipt of the window move event from the remote application; and determining that the first mouse input event is not associated with a window move event for the remote application based on receipt of a different event from the remote application.

In another aspect, the method further includes, in response to determining that the first mouse input event is associated with a window move event for the remote application: refraining from transmitting mouse events to the remote application in response to detection of the subsequent mouse input events indicating drag inputs for the window GUI of the remote application until detection of a second mouse input event indicating a mouse button release.

In another aspect, the method further includes, further in response to determining that the first mouse input event is associated with a window move event for the remote application: disregarding window move events received from the remote application until detection of a second mouse input event indicating a mouse button release.

In another aspect, the window GUI of the remote application is integrated within the local GUI of an operating system of the client device.

In another aspect, the method further includes, responsive to determining that the first mouse input event is not associated with a window move event for the remote application, continually transmitting mouse drag events to the remote application in response to the subsequent mouse input events.

Another aspect of the present disclosure provides a system of generating a graphical user interface of a remote application. The system includes a memory device, and a hardware processor coupled to the memory device. The hardware processor is configured to generate a window graphical user interface (GUI) for a remote application executing within a remote session established between a client device and a remote server. The window GUI of the remote application executing on the remote server is rendered for display within a local GUI by the client device. The hardware processor is further configured to detect a first mouse input event indicating a drag input within the window GUI of the remote application; determine whether the first mouse input event is associated with a window move event for the remote application; and responsive to determining that the first mouse input event is associated with a window move event for the remote application, modify the local GUI to display a locally cached copy of the window GUI in an updated location in the local GUI in response to subsequent mouse input events indicating drag inputs for the window GUI of the remote application.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for enhancing user experience during windows-related operations for graphical user interfaces for remote sessions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
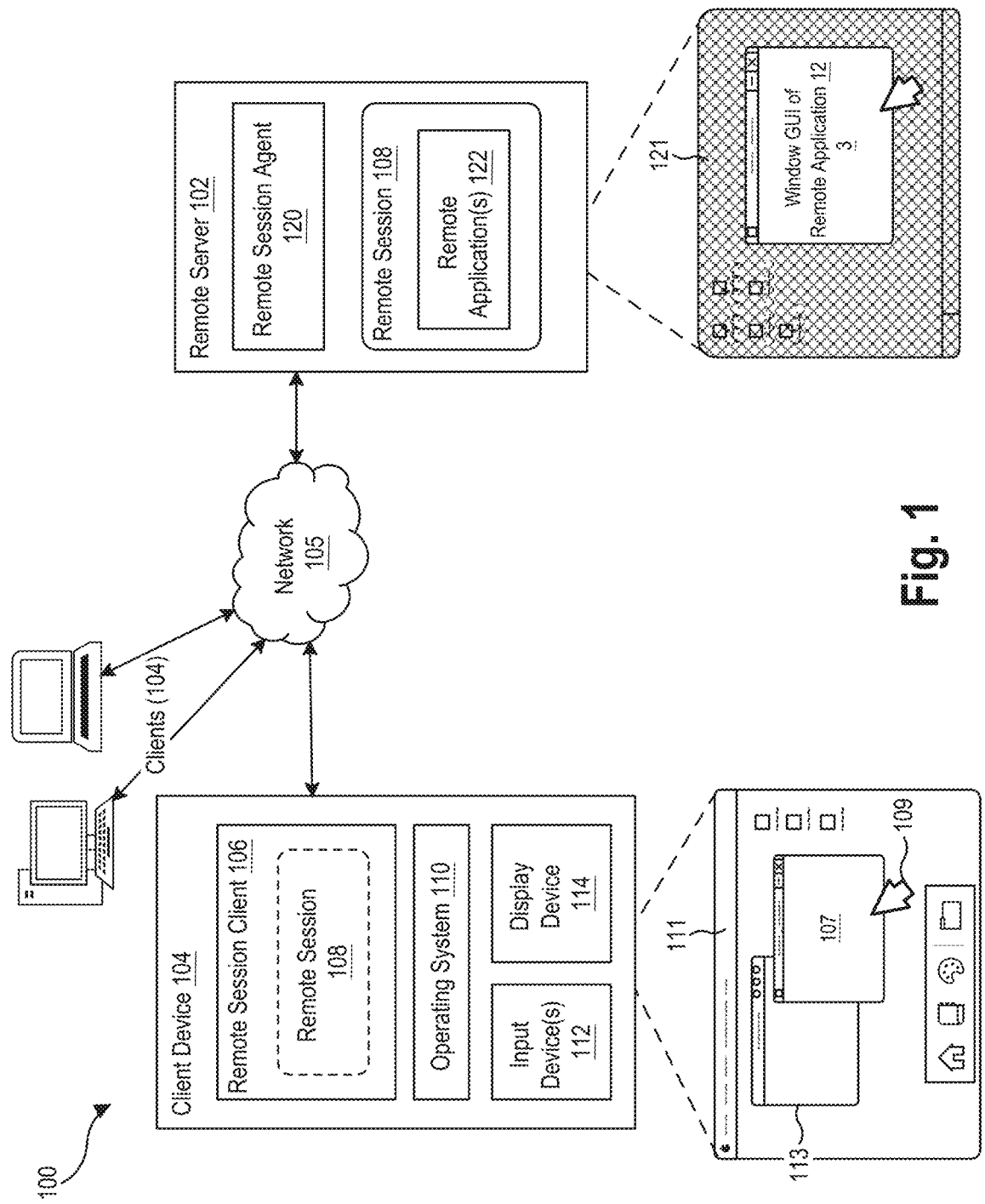
FIG. 1 is a block diagram illustrating a system for generating graphical user interfaces to a remote application executing within a remote session according to an exemplary aspect.

FIG. 1 is a block diagram illustrating a system 100 for generating graphical user interfaces to a remote application executing within a remote session according to an exemplary aspect. The system 100 includes a remote server 102 communicatively connected to one or more client devices 104 by a communications network 105. The client device(s) 104 and/or the remote server 102 may be any computing device, physical server, computer server, desktop, laptop, handheld device, tablet device, smartphone, or any other electronic device as described herein. The network connection between the client device(s) 104 and the remote server 102 may be a network socket, or other more complex communication channel. In some aspects, the network 105 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In one aspect, the client device 104 includes a remote session client 106 configured to establish a remote session 108 with a remote session agent 120 executing on the remote server 102. The remote session 108 established between the remote session client 106 and the remote server 102 may be configured to provide access at the client device 104 to one or more "remote" applications 122 executing on the remote server 102. In some cases, the remote applications 122 may be software programs or versions of software programs that might not be otherwise available or installed locally on the client device 104. In one aspect, the remote session agent 120 may be a remote application server (RAS) agent configured to remotely provide instances of software applications to the client device 104. In other words, the remote session agent 120 is said to "publish" resources, which can include one or more remote or "published" applications, to a client device 104, which is rendered and displayed on a local display device of the client device 104. The remote server 102 may be a virtual application and desktop delivery system that allows users to access and use applications and data from any device, such as the client device 104.

In some aspects, the remote session client 106 is a software application that establishes the remote session 108 as a connection to a new instance of a virtual desktop (e.g., a virtual machine) instantiated by the remote server 102 specifically for a remote session 108, and that allows access to a user's data and applications (e.g., via a roaming profile). An example of a remote session client 106 may be a Parallels® RAS Client (Remote Application Server™ Client) software application. In other aspects, the remote session client 106 may be a remote access application that establishes the remote session 108 as a remote desktop connection to a specific computing device (having the remote session agent 120 executing thereon), such as the user's desktop at their office, server, or virtual machine. Example of remote access applications include Parallels Access® (formerly Parallels Mobile), Apple Remote Desktop™, Citrix GoToMyPC®, and Virtual Network Computing (VNC®). In some aspects, the remote session agent 120 may provide a virtual desktop environment, sometimes referred to as a virtual desktop infrastructure (VDI) for executing applications and accessing data (e.g., private files). The remote session 108 may be implemented using a remote desktop protocol, such as Remote Desktop Protocol (RDP), Virtual Network Computing (VNC), or Personal Computer over Internet Protocol (PCoIP).

In one aspect, the client device 104 further includes an operating system 110, one or more input device(s) 112, and at least one display device 114. The operating system 110 is configured to support execution of the remote session client 106, which includes handling input data received from the one or more input devices 112 as user input to the remote session client 106 and managing the rendering and display of a graphical user interface associated with the remote session client 106 on the display device 114 (e.g., monitor, screen). In some aspects, the operating system 110 may include an input subsystem (not shown) for generating system-level input events from the raw data and signals received from the input devices 112, where such input events can then be consumed by the operating system 110 or applications, such as the remote session client 106. The input device(s) 112 are communicatively connected to the client device 104 and include one or more components (e.g., buttons, scroll wheel, proximity sensors) configured to generate input data in response to user actions (e.g., button click, key activation, motion, gesture) for manipulating and interacting with a graphical user interface of the client device 104. Examples of the input devices include a computer mouse, a joystick, a trackpad, a trackball, pointing device, a stylus, touchscreen, and keyboard.

In one example operation, a user starts execution of the remote session client 106 on the client device 104. The remote session client 106 may (e.g., as directed by user input) open a remote session 108 to a host by establishing a connection channel with the remote session agent 120 executing on the remote server 102. The remote session agent 120 may execute the remote session 108 by instantiating a virtual machine on the remote server 102 that corresponds to the remote session 108. During execution, the remote session client 106 and remote session agent 120 exchange input data, output data, and other remote session protocol data. The output data (e.g., transmitted from the remote session agent 120 to the remote session client 106) may include data such as graphical data, framebuffers, graphical primitives (e.g., controls, forms, fonts, and colors), and event data used to generate, at the client-side, a graphical user interface representing the remote desktop.

As shown in FIG. 1, the remote session client 106 renders, for display on the display device 114 that is operatively connected to the client device 104, a graphical user interface (GUI) 107 corresponding to the remote session 108. The GUI 107 corresponding to the remote session 108 is rendered based at least in part on the received output data from the remote session agent 120. The GUI 107 may graphically depict an entire (remote) desktop (121), a portion of a desktop, a single windowed application (123), or multiple windows, of remote applications 122 and other resources which are executing as part of the remote session 108. The remote session client 106 may render the GUI 107 in a variety of view modes of operation, including a full-screen mode, a windowed mode, and a modality mode. In the "windowed" mode, GUI 107 is rendered as a graphical control element referred to as a "window" incorporated into a desktop GUI 111 provided by the operating system 110. In one aspect, the remote session client 106 may be render the remote GUI 123 for each remote application 122 as a separate window GUI 107 for display the remote application 122 directly on the local desktop GUI 111. In this aspect, sometime referred to as a coherency-, unity-, or seamless mode, such a window GUI 107 is integrated alongside windows of locally running applications (such as a window 113 shown in FIG. 1) without requiring the user to manage separate desktop GUIs. In some cases, a user may work in a mixed local and remote environment, wherein the user operates both local and remote applications (i.e., applications running in a remote session) simultaneously. For example, a user may access via remote session an instance of an enterprise docketing software that is only available on a central server, while also running on their local desktop a mail application and a word processing application. As part of their workflow, the user may regularly switch between using docketing software (i.e., the remote application) and using the locally executing applications (113).

The remote session client 106 is configured to transmit or relay, to the remote session agent 120, user input data corresponding to the user's interactions with the GUI 107. For example, when the user moves an input device (as represented by a pointer 109) across the window GUI 107, the remote session client 106 relays such input data through the remote session for handling by the remote session agent 120. The input data (e.g., transmitted from the client device to the remote server) may include input data generated by the input devices 112, such as keyboard data, mouse data, and other input device data, related to the user interaction with the graphical user interface 107 used to control the remote session 108. If the transmitted input data results in changes to the GUI 123 of the remote application, such changes are returned to the remote session client 106, which updates the window GUI 107 accordingly. It is noted that such exchange of input data and output data for the remote session 108 occurs across the network 105, which can have network performance issues such as latency. Delays in the exchange of input data and output data for the remote session 108 can negatively affect the user experience of the remote session particularly in cases of certain (common) windows-related operations, such as moving a window or resizing a window.

Figure 2:
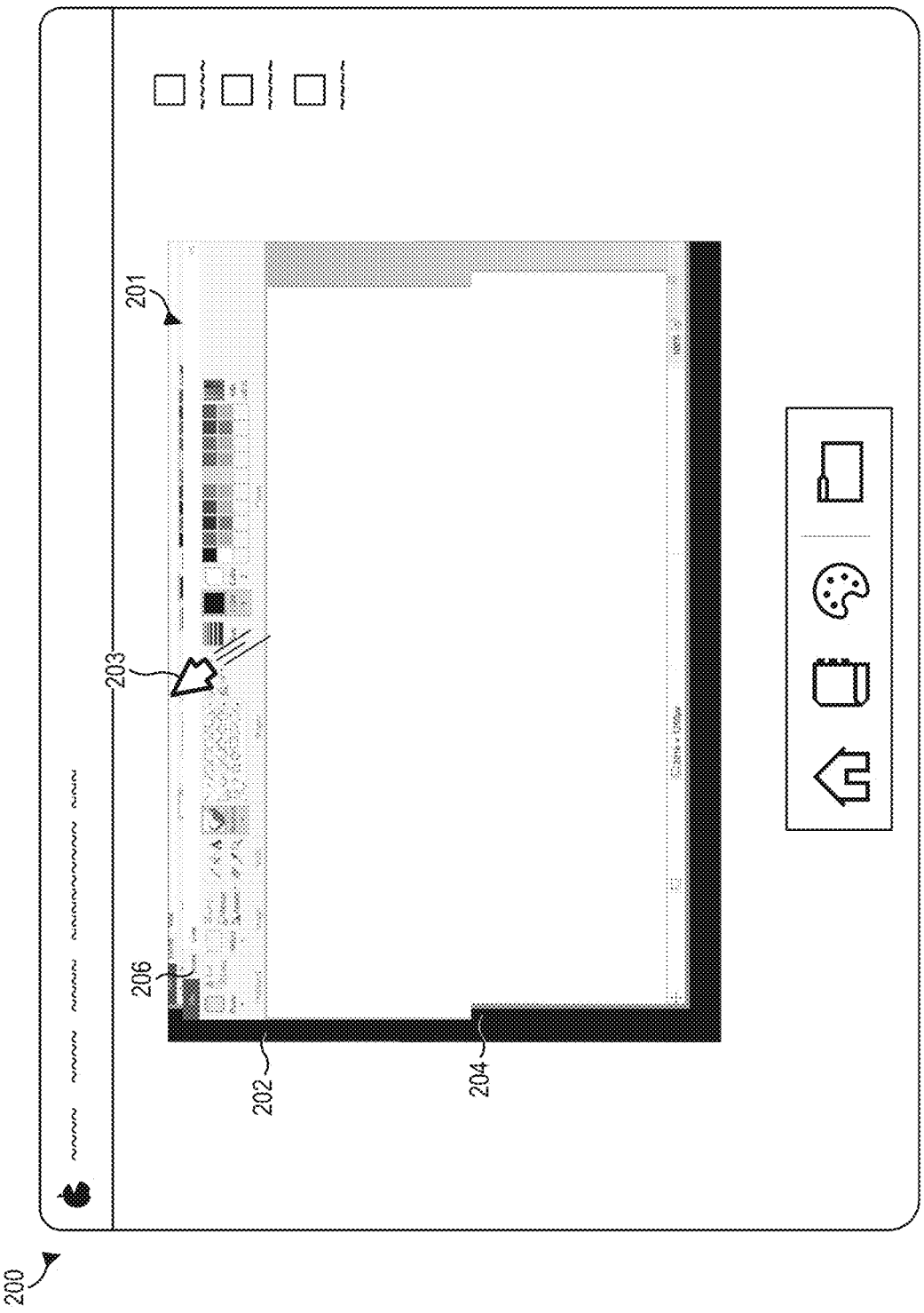
FIG. 2 depicts an example graphical user interface during a window-move operation performed within a remote session.

FIG. 2 depicts an example graphical user interface 200 during a window-move operation performed within a remote session. In the example shown, the graphical user interface 200 includes a window 201 for the remote application executing in the remote session. In one approach to handling a window move operation, the local host application (e.g., remote session client 106) receives a mouse drag input event related to the window 201 of the remote application (as shown by the motion of a pointer 203), and sends the event to the remote application. In response to the mouse drag input, the remote application 122 moves the window on the remote host. The remote application 122 then sends an event about the window moving to the local host application, and sends an updated image of the remote host to the local application. In response, the local application moves the window based on the updated window coordinates and updates window contents using the updated image. It is noted that the mouse input is forwarded to the remote application for handling because the remote application is able to correctly interpret the mouse input's effect on the window 201. The remote application is able to distinguish, for example, between mouse input that drags a title bar or chrome of the window 201 from mouse input that draws on a canvas or moves objects within the GUI of the remote application. In contrast, from the perspective of the remote session client 106, the semantics of the window GUI's contents can be characterized as a black box.

As mentioned above, while moving the window 201 of a remote application, a user can encounter numerous graphical artifacts in the window. Examples of graphical artifacts are depicted in FIG. 2 as regions 202 on the window's edges representing display areas where the window previously was located, regions 204 representing an intersection of display areas where the graphical update has been received and has not been received, and region 206 representing duplicated portions of the window (e.g., menu bar). It has been determined that such graphical artifacts result from the delay in receiving window-move events and window contents and images from the remote application. Moreover, window-move events from the remote application 122 arrive with sufficient delay that the resulting animation of moving the window feels jerky and unnatural in comparison to moving the local host's windows.

Figure 3:
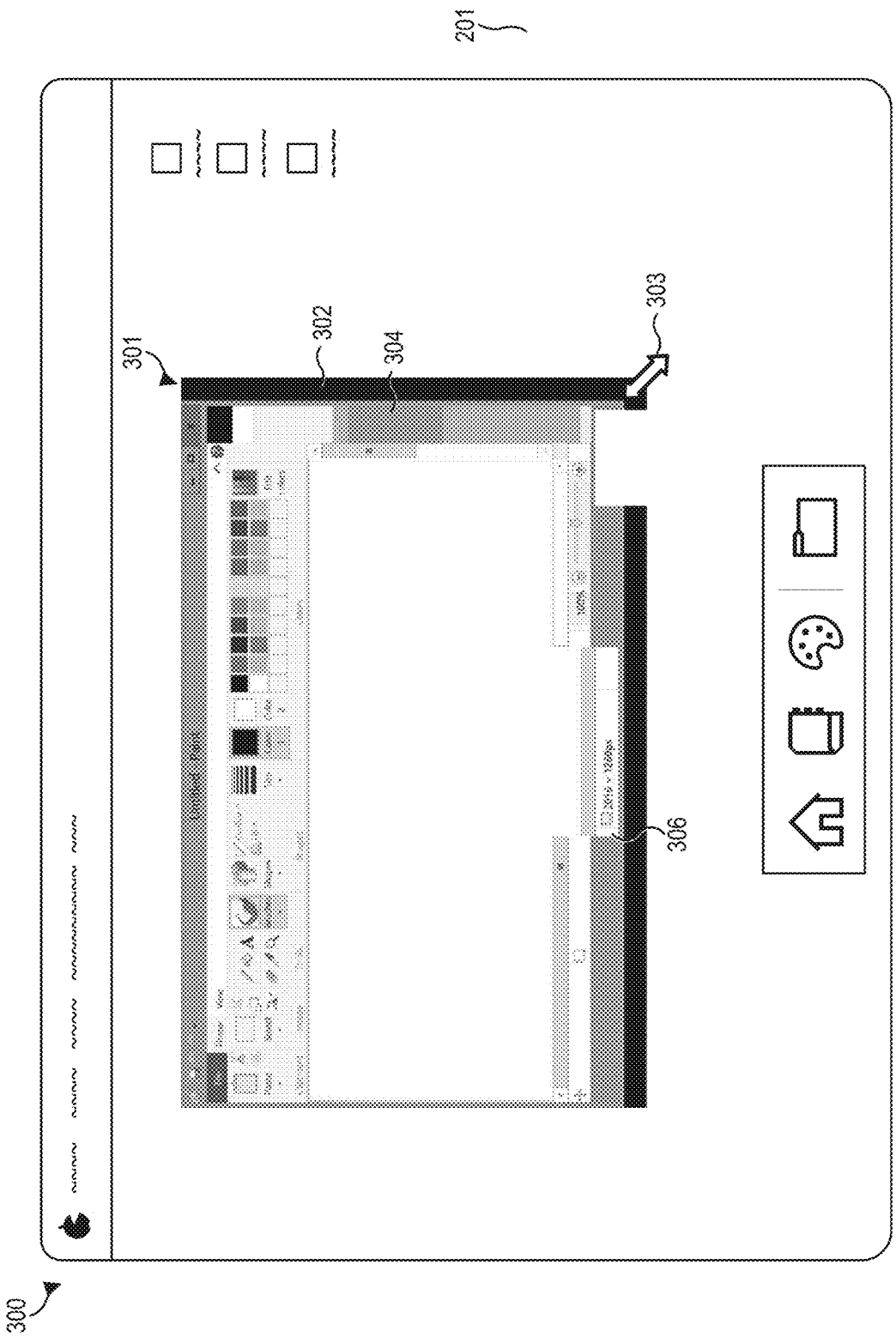
FIG. 3 depicts an example graphical user interface during a window-resize operation performed within a remote session.

Similar types of graphical artifacts and user experience issues can arise during window-resize actions within a remote session, as shown in FIG. 3. FIG. 3 depicts an example graphical user interface 300 during a window-resize operation performed within a remote session. In one approach to handling a window size operation, the local host application (e.g., remote session client 106) receives a mouse drag event related to the window 301 of the remote application which resulted from interaction by the pointer 303 with the lower right corner of the window 301. The local application sends the event to the remote application. The remote application 122 resizes the window on the remote host, and sends an event about the changed window geometry to the local host application. The remote application also sends an updated image of the remote host to the local application. The local application resizes the windows, and updates the window content (i.e., redrawing some or all of the contents in the window 301). In this approach, the local application is designed to relay every mouse input event and wait for each resizing update from the remote application to render the corresponding local GUI. Similar to the issues discussed in the above window-move operation, the user may encounter graphical artifacts 302, 304, 306 on the window edges and other portions during the window resizing. Because of the delay in receiving mouse-resize events and image data of the resized window contents from the remote application, the portions where the window is resized display un-drawn or black areas (302) or graphical artifacts (304, 306). Moreover, mouse movements of the pointer 303 may feel jerky or unnatural to the user in comparison with visual animations resulting from resizing windows of local applications.

Window Moving Operations

According to one aspect, the remote session client 106 is configured to distinguish between mouse drag events that trigger window move events from other mouse drag events. In doing so, the remote session client 106 is able to move the window GUI shortly after the local application receives drag events from the host operating system 110 (i.e., without waiting for updates from the remote session), resulting in smoother GUI animation with reduced glitches and visual artifacts.

Figure 4A:
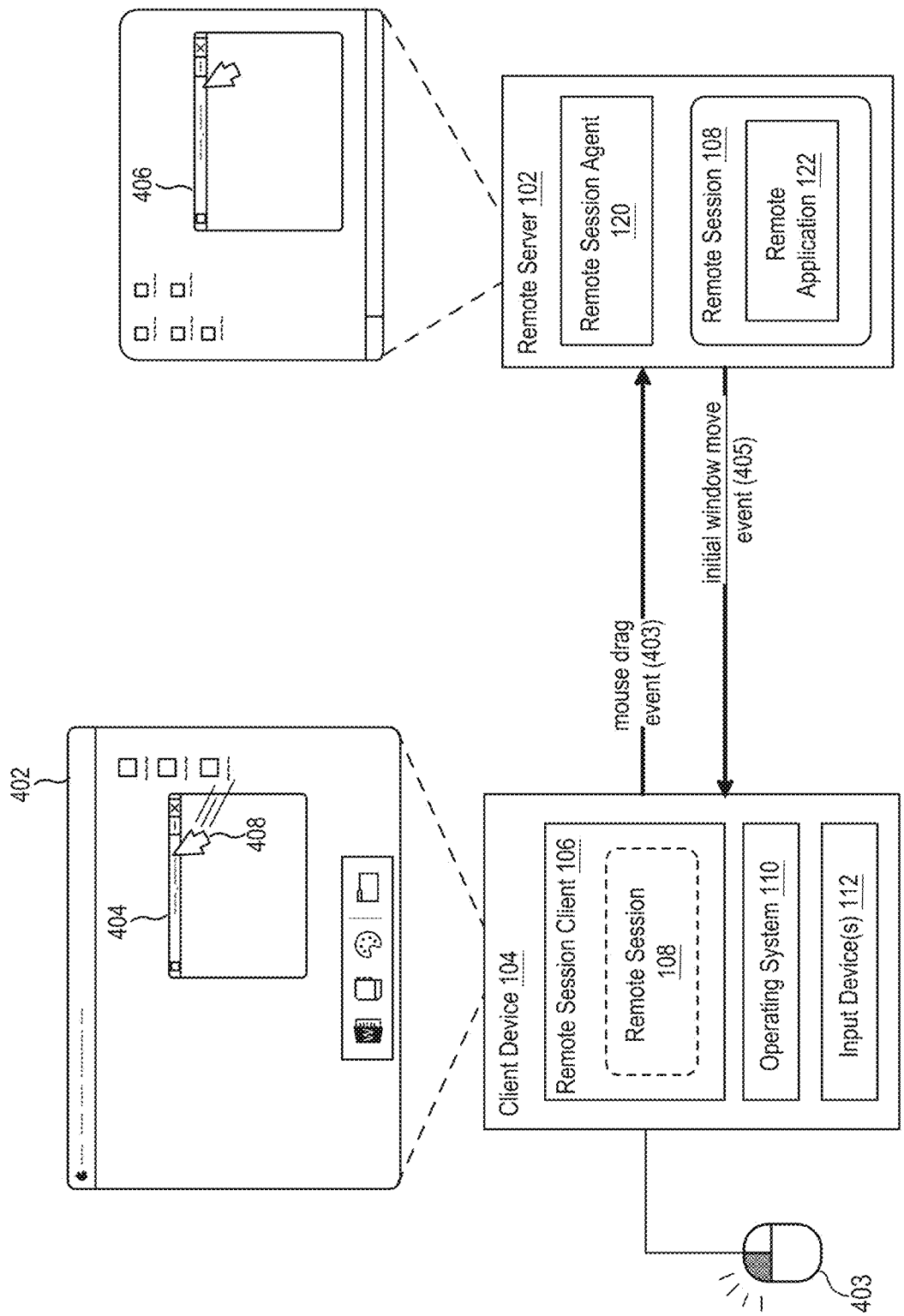
FIGS. 4A, 4B, and 4C are block diagrams depicting example operations for generating a graphical user interface for a remote application during a window-move operation according to an aspect.
Figure 4B:
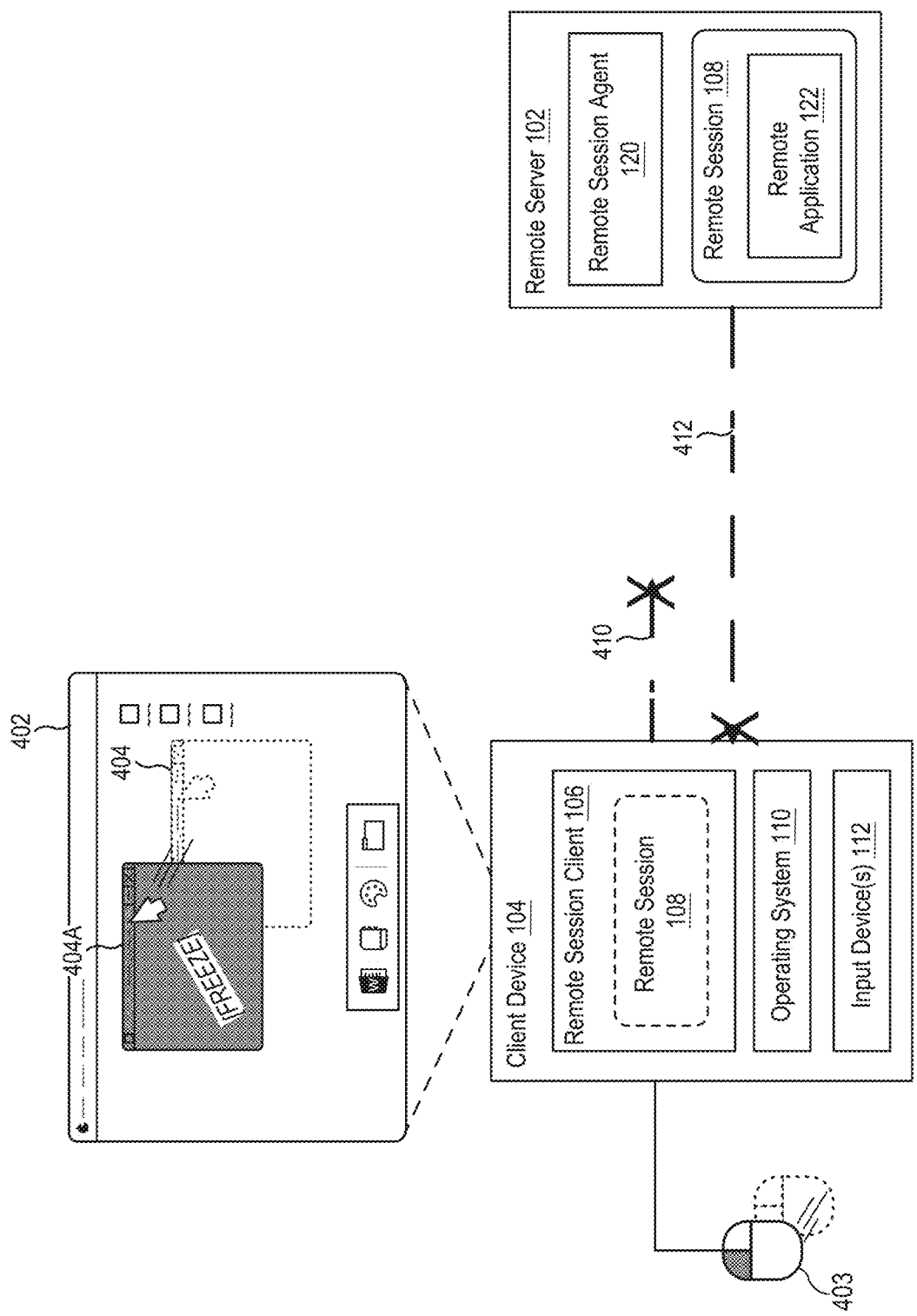
Figure 4C:
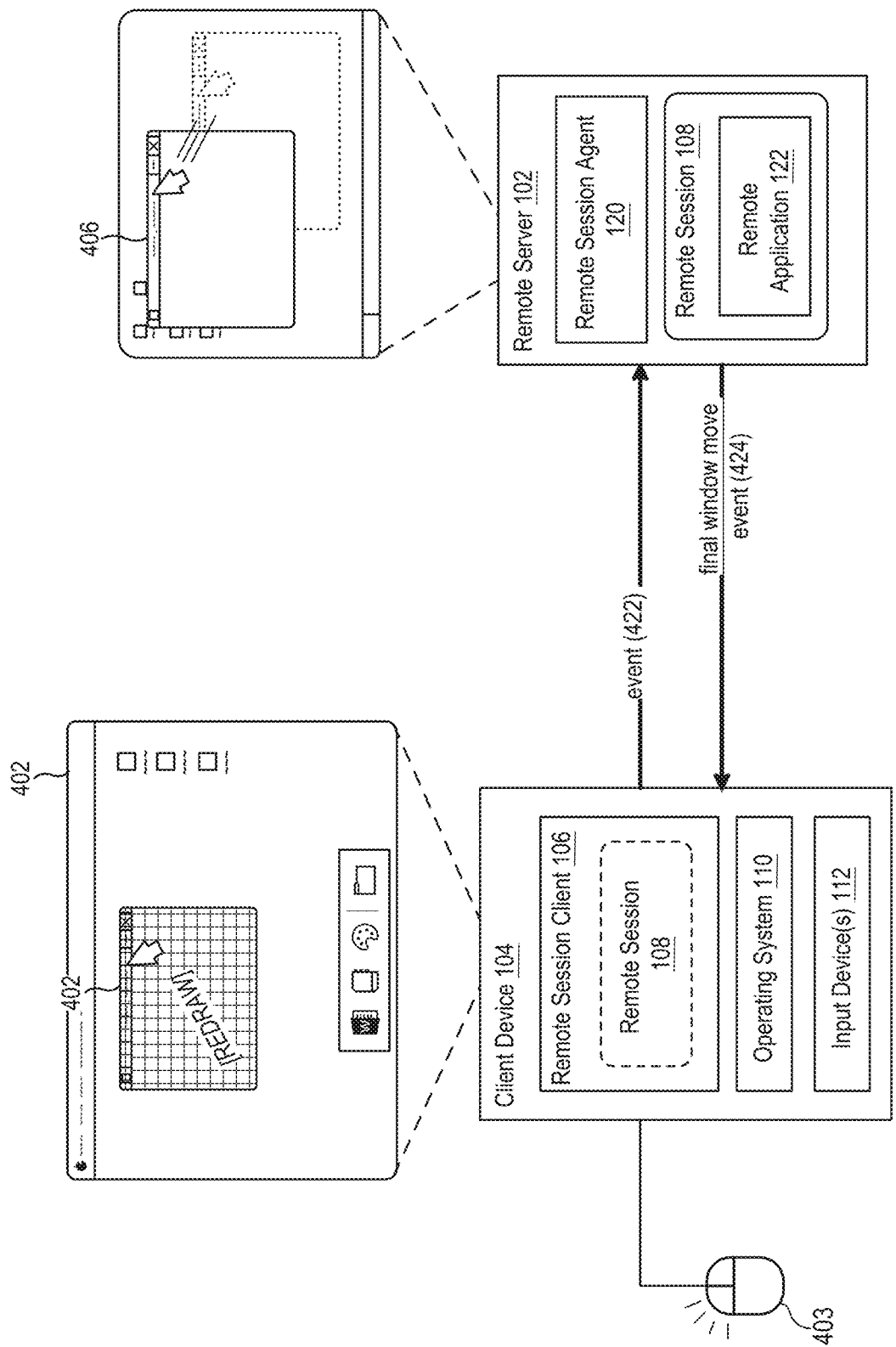

FIGS. 4A to 4C are block diagrams depicting example operations for generating a graphical user interface for a remote application during a window-move operation according to an aspect. In the example shown, the remote session client 106 has generated a window graphical user interface (GUI) 404 for a remote application 122 executing within a remote session 108 established between the client device 104 and the remote server 102. The window GUI 404 is rendered for display within a desktop GUI 402 for the local operating system 110.

As shown in FIG. 4A, the user has clicked the left mouse button of the computer mouse 403 while at a certain position within the window GUI 404 of the remote application and subsequently moved the mouse 403. The operating system 110 receives input data from the mouse 403 and registers this input data as a mouse left-button drag input event occurring within the coordinates of the window GUI 404 owned by the remote session client 106. When the remote session client 106 detects the mouse left-button drag event, the remote session client 106 "freezes" the contents of the window GUI, and sends input data indicating the mouse left-button drag event (403) to the remote application 122 via the remote session agent 120 and network 105. The remote application 122 and/or guest operating system of the remote server 102 then process the mouse left-button drag event. If the remote application 122 sends back a window-move event (405), then the remote session client 106 may stop the sending of mouse events to the remote application until the left-mouse button is released. If the remote application does not send back a window-move event 405, then the remote session client may continue relaying the mouse drag events to the remote application as during normal operation.

As shown in FIG. 4B, the user has moved the mouse 403 with the left-button depressed, thereby generating mouse drag input events. On every next mouse drag event, the remote application 122 may refrain from sending mouse events to the remote application (as depicted by segment 410). Instead, in response to these subsequent mouse drag events, the remote session client 106 moves the window GUI 404 using the local means of the client device 104, such as a local window manager of the operating system 110. As shown, the remote session client 106 moves the window GUI 404 to a new location 404A that is northwest of the previous location in response to local window drag events providing new positional coordinates to the northwest. In an alternative aspect, instead of stopping the transmission of mouse drag events, the remote application 122 may continue to send the mouse drag events but simply ignore or disregard the window-move events returned in response (depicted as 412). It is understood that the subsequent mouse drags events and the initial mouse drag event are part of the same continuous user interaction with the input device, which may be comprised of a sequence of a mouse left-button down event, a plurality of mouse movement events (and mouse drag events), and a mouse left-button release event. As such, the initial mouse drag event may be part of multiple initial mouse drag events that occur in the beginning of a user interaction with the graphical user interface and the subsequent mouse drag events are the remainder of the drag events in that same user interaction.

As shown in FIG. 4C, when the left mouse button of the mouse 403 is released, the new position (404A) of the window 404 is sent to the remote application 122, and the remote session client waits for a window move event. In one aspect, the remote session client may transmit one or more events 422, such as a mouse-release event followed by a special event indicating a change in window geometry, which provide the new position of the window to the remote application. When the window-move event 424 is received, the remote session client enables windows content updating for the window GUI 404 and redraws the window contents with the updated window image.

Figure 5:
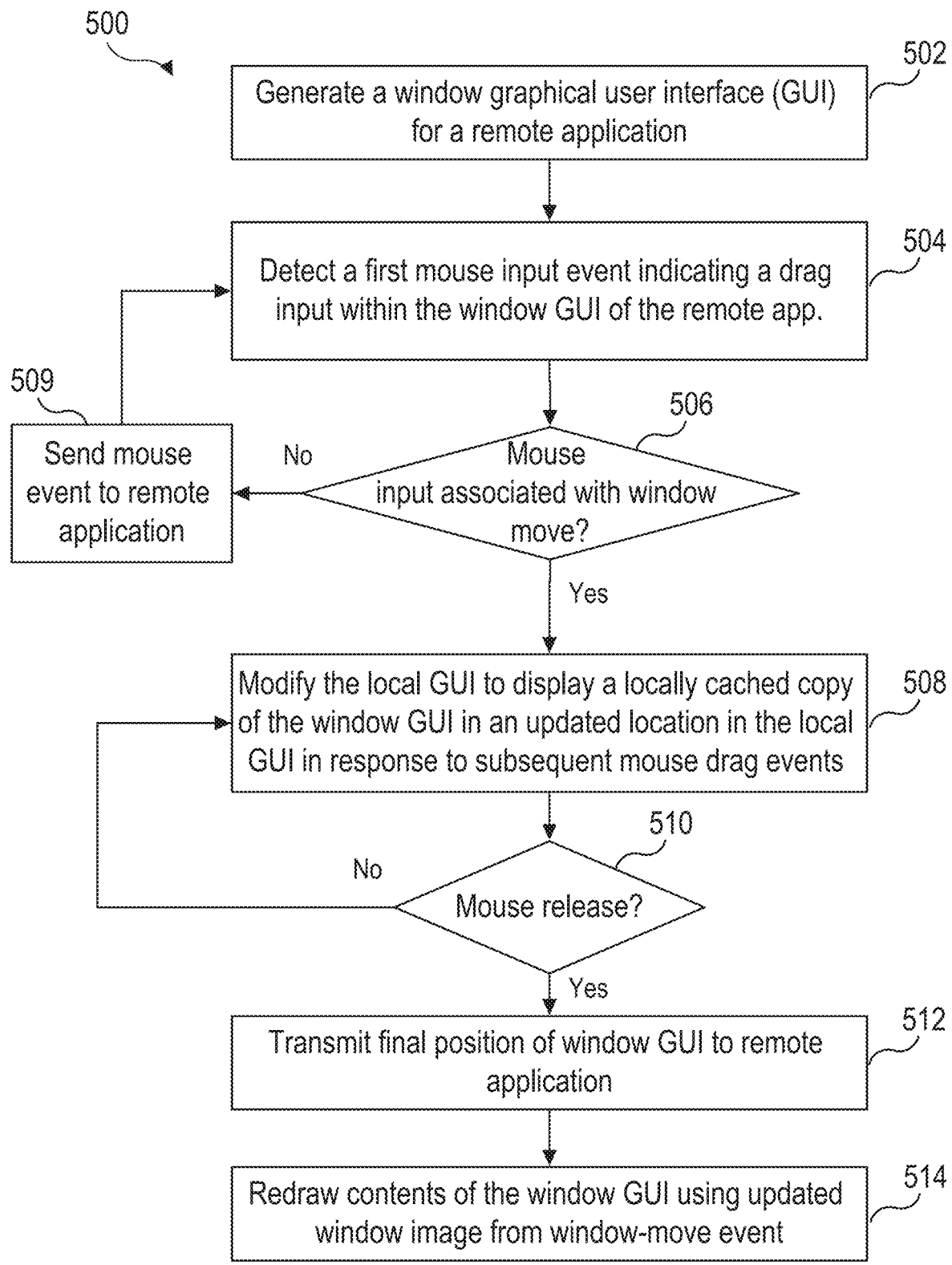
FIG. 5 is a flowchart illustrating a method for generating a graphical user interface of a remote application according to an exemplary aspect.

FIG. 5 is a flowchart illustrating a method 500 for generating a graphical user interface of a remote application according to an exemplary aspect. It is noted that the following description of the exemplary method makes reference to the system and components described above, such as in FIG. 1 and FIGS. 4A-4C.

The method 500 begins at step 502 in which the remote session client 106 generates a window graphical user interface (GUI) 107 for a remote application 122 executing within a remote session 108 established between a client device 104 and a remote server 102. The window GUI of the remote application executing on the remote server is rendered for display within a local GUI 111 by the client device 104. In some aspects, the window GUI 107 of the remote application is integrated within the local GUI 111 of an operating system of the client device, i.e., displayed in a seamless, integrated manner (Coherence Mode) so as to give user the impression the remote application were executing on the client device itself rather than in a separate desktop environment.

At step 504, the client device detects a first mouse input event indicating a drag input within the window GUI 107 of the remote application. In some aspects, the first mouse input event may correspond to input data specifying left mouse button down action and mouse movement as generated by an input device 112. While aspects of the present disclosure refer to "mouse" events, it is understood that the actual input device used to generate the input event may be other (non-mouse) input devices, such as a stylus, trackpad, a touch input device, which generate input events (e.g., Ink Events, gestures) that the operating system 110 can map to, or use to emulate, corresponding mouse input events.

At step 506, the remote session client 106 determines whether the first mouse input event is associated with a window move event for the remote application. In some aspects, the remote session client 106 may disable display updating of the window GUI 107, or "freeze" the contents of the window GUI, and transmits the first mouse input event to the remote application using the remote session. The remote session client 106 may determine that the first mouse input event is associated with a window move event for the remote application based on receipt of a window move event (424) from the remote application. Alternatively, the remote session client 106 may determine that the first mouse input event is not associated with a window move event for the remote application based on receipt of a different event from the remote application. In this way, the remote session client 106 is able to distinguish the window-move events from other mouse drag events and temporarily switch to locally handling the window move operation. Examples of the different events that can be subsequently received (and identified by the remote session client as the basis for concluding that the first mouse input event is not associated with a window-move event) include mouse cursor changing events, window-resize events, and window-update events.

If not, (i.e., responsive to determining that the first mouse input event is not associated with the window move event for the remote application), at step 509, the remote session client 106 continually transmits mouse drag events to the remote application in response to the subsequent mouse input events. If so (i.e., responsive to determining that the first mouse input event is associated with a window move event for the remote application), at step 508, the remote session client modifies the local GUI to display a locally cached copy of the window GUI in an updated location in the local GUI in response to subsequent mouse input events indicating drag inputs for the window GUI of the remote application. In some aspects, the remote session client refrains from transmitting mouse events to the remote application in response to detection of the subsequent mouse input events indicating drag inputs for the window GUI of the remote application until detection of a second mouse input event indicating a mouse button release. In other aspects, the remote session client disregards window move events received from the remote application until detection of a second mouse input event indicating a mouse button release.

In some aspects, the remote session client 106 may store or cache a local copy of the rendered contents of the remote application GUI (e.g., as a framebuffer) and uses the local copy for subsequent redrawing. For example, when the window GUI 404 is moved to a new location within the desktop 402, the remote session client uses the locally cached copy of the remote application GUI to redraw the window GUI 404 in its new location. In another example, if another GUI element in the desktop 402 temporarily overlays the window GUI 404 thus triggering a redrawing of the window GUI, the remote session client 106 redraws the window GUI contents using the locally cached copy of the remote application's window GUI. In some aspects, the remote session client 106 may disable updating of the contents of the window GUI 404 that may be triggered by updates from the remote session 108. In some aspects, the remote session client 106 may modify the rendering of the locally cached copy of the remote application GUI to visually indicate that updating of the window GUI has been paused during the window-move operation (e.g., with a gray tint). In other aspects, the remote session client 106 may leave the rendering of the locally cached copy of the remote application GUI untouched so as to provide a locally generated window-move operation that is seamless to the end user.

At step 510, in response to detecting a second mouse input event indicating a mouse button release, the remote session client 106 transmits a final position of the window GUI to the remote application executing on the remote server. In some aspects, further in response to detecting the second mouse input event indicating the mouse button release, the remote session client 106 also re-enables windows updating of the window GUI.

At step 512, the remote session client 106 receives a window move event from the remote application comprising an updated window image, and redraws the contents of the window GUI with the updated window image. The received window-move event may contain meta-data indicating positional coordinates of the remote application's GUI. In some aspects, the received window-move event may include image data (e.g., framebuffer) or image primitives for the updated window image that the remote session client uses to redraw the window GUI 107. In some aspects, the event indicating a window move may be implemented by a type of event that signals when a window geometry has changed, which contains information related to a window's new position and/or size.

Window Re-Sizing Operations

According to one aspect, the remote session client 106 is configured to predict how the window content image changes while the remote application's window is being resized. In doing so, the remote session client 106 is able to redraw the contents of the window GUI with a locally generated GUI without waiting to receive every updated window content image from the remote session, resulting in smoother resizing animations with reduced glitches and visual artifacts.

In one aspect, the window GUI generated by the remote session client 106 is configured to permit resizing by the user (other applications may have a fixed interface which restrict such resizing). When the user begins to resize a window of the remote application, the remote session client saves the window contents image, and sends a resizing event to the remote application. The remote session client stretches the saved image to the new window size and waits for an updated window image from the remote application. When the updated image comes, the remote session client compares the received window image with the previously saved image and attempts to identify resizing patterns for different parts of the window. At a subsequent moment in which the window size is changed, the remote session client draws the resized window contents according to the calculated resize patterns, and waits for the updated image from the remote application to recalculate or refine the resize patterns. When the user finishes the window resizing (e.g., as trigger by release of the mouse button), the remote session client waits for the updated and resumes drawing the contents of the window GUI of the remote application as per normal operation.

Figure 6:
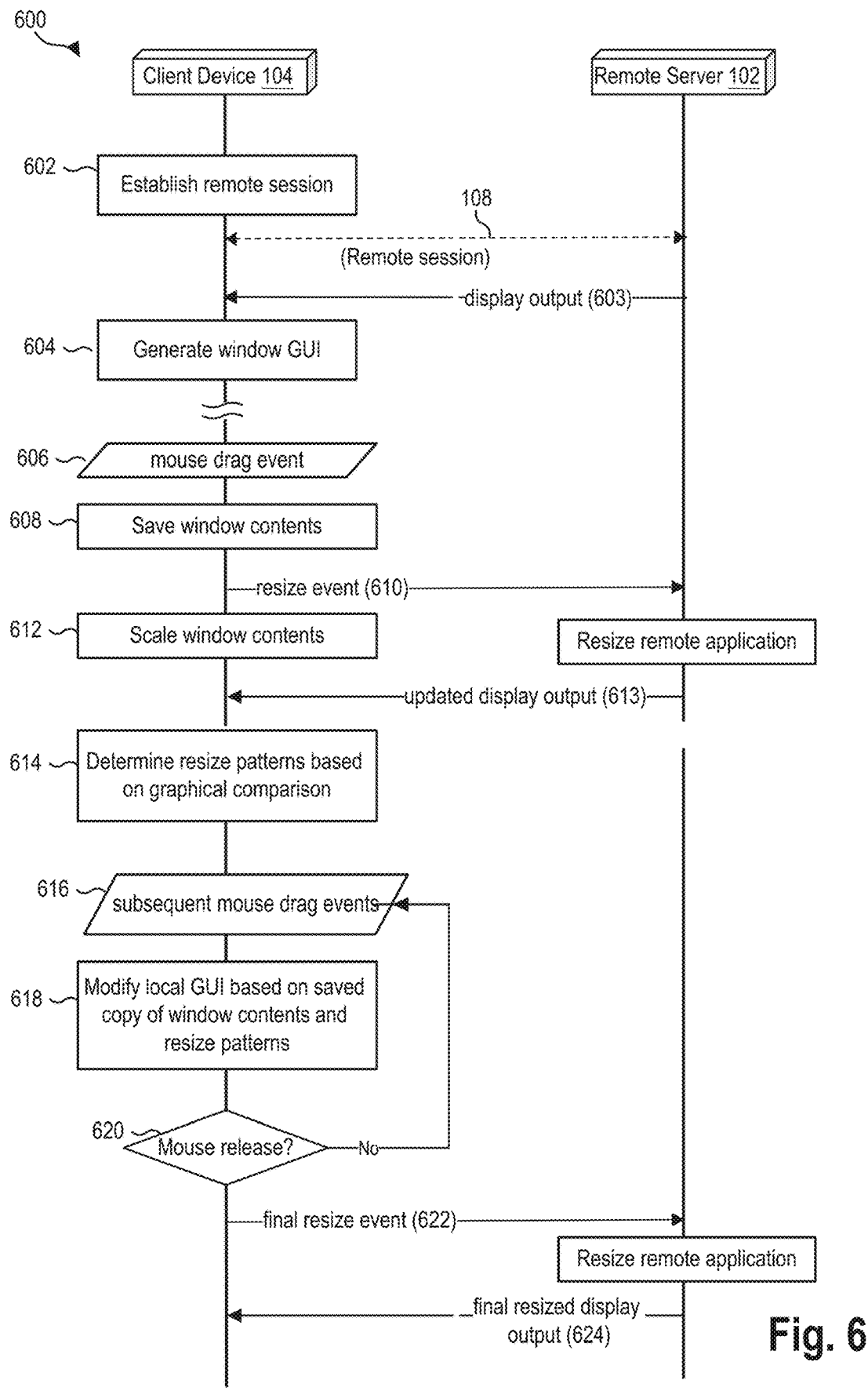
FIG. 6 is a sequence diagram of example operations for generating a graphical user interface for a remote application during a window-resize operation according to an aspect.

FIG. 6 is a sequence diagram of example operations 600 for generating a graphical user interface for a remote application during a window-resize operation according to an aspect. It is noted that the following description of the exemplary method makes reference to the system and components described above, such as in FIG. 1.

As shown in FIG. 6, at 602, the remote session client 106 executing on the client device 104 establishes a remote session 108 with the remote session agent 120 executing on the remote server 102. The establishment of the remote session 108 may include execution of a remote application 122, multiple remote applications 122 (using the same remote session), or even an entire remote desktop. At 603, the remote session agent 120 transmits to the remote session client 106 display output data, which can graphical data, framebuffers, graphical primitives (e.g., controls, forms, fonts, and colors) representing the graphical user interface of the remote application.

At 604, the remote session client 106 generates a window graphical user interface (GUI) 107 for the remote application 122 executing within the remote session 108, based on at least in part on the display output data provided by the remote session agent (at 603). This window GUI 107 is rendered for display within a desktop GUI 111 for the local operating system 110.

At 606, during operation, the remote session client 106 detects a first mouse input event indicating a drag input within the window GUI of the remote application. The remote session client determines whether the first mouse input event is associated with a window resize event for the window GUI of the remote application. In some aspects, a determination that the mouse input is related to a window-resizing action may be made based the location of the mouse input occurring at certain locations associated with the window's border (i.e., along the window's edges). In response to determining that the window GUI is being resized, at 608, the remote session client stores an image copy of the window GUI of the remote application. At 610, the remote session client transmits a resize event to the remote application indicating a change in at least one dimension. At 612, while waiting for the remote session agent to respond, the remote session client may update the window GUI by stretching the image copy along the resized dimension and drawing the stretched image copy within the newly sized window GUI. For example, the remote session client may detect a resizing event specifying a change to a first dimension (height of the window GUI), and graphically transform the image copy along the first dimension (lengthen or shorten the image copy) for rendering.

At 613, the remote session client receives a resize event from the remote application containing an updated window GUI. At 614, the remote session client determines one or more resize behavior patterns of the window GUI. The resize behavior patterns specify resizing behavior of the contents in the window GUI responsive to a change in the window size. In some aspects, the remote session client may perform a graphical comparison of the updated window GUI with the stored cached copy of the window GUI, and determine the one or more resize behavior patterns of the window GUI according to the graphical comparison. An example resize behavior pattern is shown in FIG. 7.

Figure 7:
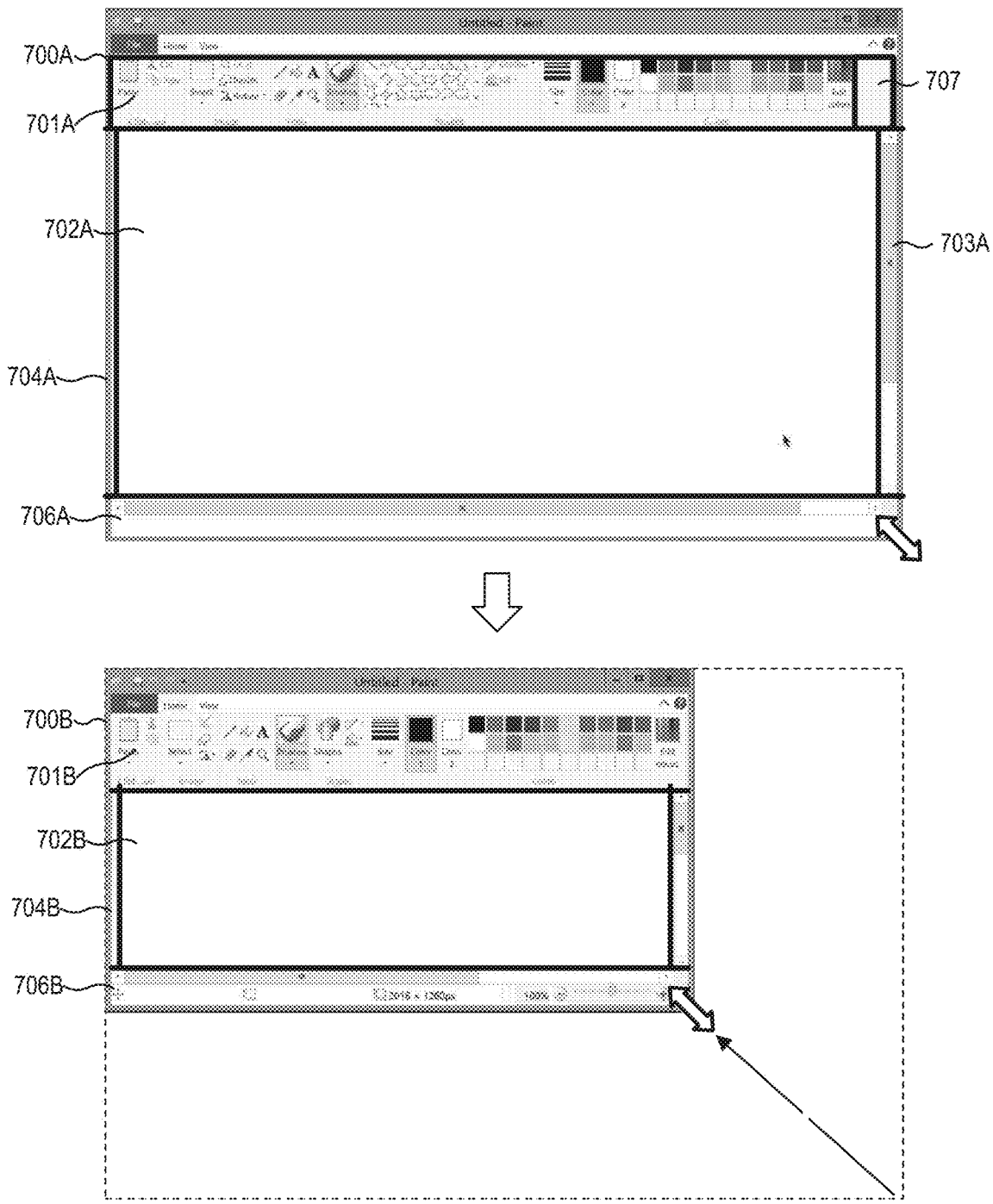
FIG. 7 is a block diagram depicting a resize behavior pattern for a window graphical user interface according to an aspect.

FIG. 7 is a block diagram depicting a resize behavior pattern for a window graphical user interface according to an aspect of the present disclosure. A resize pattern that specifies the behavior of the contents in a window graphical user interface when the window is resized. Different parts of a window GUI have different resize behavior patterns. For example, the central or middle part of an application window resizes in both directions, while parts of the application window by the window's edges remains the same or are stretched horizontally/vertically. To detect resize patterns for different parts of window, the remote session client uses two window images of different sizes to form a graphical comparison. In the example shown, a first window image 700A representing an original state of a window GUI for a remote application is graphically compared to a second window image 700B representing a resized state of the window GUI. The example window images depict a change in window size in response to the resize event in which the window size is reduced in height and width.

In one aspect, each window image may be divided into several blocks that represent different portions of the window GUI. In some aspects, the window image can be divided into blocks based on additional metadata information about window content obtained from the remote desktop session, such as the layout, labeling, or IDs of controls (e.g., buttons, text fields). Some blocks may represent chrome or graphical control elements of the window GUI that behaves in pre-defined way when being resized. For example, the window image 700A is divided into a block 701 representing the toolbar of the GUI, a block 702 presenting a main canvas or content of the GUI, a block 703 representing a right edge and vertical scroll bar of the GUI, block 704 representing a left edge of the window, and a block 706 representing the bottom edge and horizontal scroll bar of the GUI. Similar blocks are divided and identified in the second window image 700B, and a determination is made of which blocks after resizing corresponding to each block before resizing.

In some aspects, a resize pattern for each block is determined based on block sizes and any shifts in content and imagery detected from a graphical comparison between two corresponding blocks from different window images 700A, 700B. For example, a graphical comparison of the block 701B with the corresponding block 701A reveals that the height of block 701B is unchanged, the width of the block 701B is decreased relative to the width of block 701A, and the relative position of the block is anchored to a certain window edge (e.g., left edge). Accordingly, the remote session client may determine a static resize pattern in which the block is anchored to the left most edge of the GUI and is scaled vertically but not horizontally. In another example, the remote session client may perform a graphical comparison of the block 702B with the corresponding block 702A to determine that both the width and height of the block changes during resizing. Accordingly, the remote session client may determine a bidirectional resize pattern for a region of the window GUI in which the region is scaled horizontally or vertically in response to resizing. In another example, the remote session client may perform a graphical comparison between blocks 701B and 701A to determine that the height of the block is unchanged between blocks 701A and 701B and that the content is fixed in size except for a flexible empty region 707 which reduces in size. It is understood that blocks may be subdivided further into sub-regions for characterizing different micro-behaviors within a block. For example, the block 701A may be assigned a resize pattern indicating certain toolbar buttons remain fixed (e.g., the colors buttons shown in FIG. 7) while other toolbar buttons may be truncated or eliminated from view (e.g., the shapes buttons) in response to a resizing event.

After figuring out these resize patterns for blocks, the remote session client can predict updated images for a window GUI for different sizes. For example, the remote session client can take a stored copy of the window GUI, divide the window GUI into regions, and then individually scale (or not scale) certain regions to emulate what the likely resized window update would be (as generated by the remote application on the remote host). The modified regions may then be re-assembled into a single window contents image and be used to redraw the window GUI 107 upon resizing. As such, In response to a window resizing to a smaller size, the remote session client is able to accurately predict and update the window GUI with the correctly resized regions (e.g., window edges and scroll bars) even though the remote session client has not yet received a windows update from the remote session as to what the resized window contents will look like. Accordingly, aspects of the present disclosure enable the remote session to reduce or eliminate waiting for remote application events, while drastically improving the speed of window moving/resizing and reducing graphical artifacts.

Referring back to FIG. 6, in some aspects, the remote session client may divide the window GUI into a plurality of block regions including a first region and a second region. The remote session client may then determine a bidirectional resize pattern for the first region of the window GUI based on the graphical comparison, and determine a static pattern for the second region of the window GUI based on the graphical comparison. In some aspects, at least one of the resize behavior patterns specifies that the associated block region be anchored to a window edge. In another aspect, the static pattern specifies the corresponding block region remains fixed in response to a change in window size. In some aspects, the bidirectional pattern specifies the corresponding block region is scaled at least one of horizontally and vertically in response to a change in window size.

At 616, the remote session client 106 may detect subsequent mouse input events corresponding to resize events for the window GUI of the remote application. In some aspects, the remote session client 106 may pause the sending of mouse events while the window is being locally resized, and instead, sends a window-resize event to the remote application to get an updated image of the remote window. At 618, the remote session client modifies the local GUI based on a locally cached copy of the window GUI and the determined resize behavior patterns of the window GUI in response to the subsequent mouse input events indicating drag inputs for the window GUI of the remote application. In some aspects, the remote session client draws resized contents of the window GUI based on the determined one or more resize behavior patterns. Following the example aspect described above, to draw resized contents of the window GUI based on the determined one or more resize behavior patterns, the remote session client may redraw the window GUI having the first region that is scaled according to the bidirectional resize pattern and having the second region that is scaled according to the static pattern. The remote session client continues to locally modify and redraw the window GUI in response to subsequent mouse input events until the mouse button release event is detected (at 620). In some aspects, the remote session client 106 may recalculate the resize patterns to refine and adjust the resize behavior patterns according to updated images from the remote application.

At 622, the remote session client transmits a final window resize event to the remote session agent. At 624, the remote session client receives a final resize window event from the remote application comprising an updated window image, and redrawing the contents of the window GUI with the updated window image.

Aspects of the present disclosure provide the following Examples of generating a graphical user interface of a remote application. In Example 1, the method comprising: generating a window graphical user interface (GUI) for a remote application executing within a remote session established between a client device and a remote server, wherein the window GUI of the remote application executing on the remote server is rendered for display by the client device; detecting, by the client device, a first mouse input event indicating a drag input within the window GUI of the remote application; determining whether the first mouse input event is associated with a window resize event for the remote application that contains an updated window GUI; responsive to determining that the first mouse input event is associated with a window resize event for the remote application: determining one or more resize behavior patterns of the window GUI, and modifying the local GUI based on a locally cached copy of the window GUI and the determined resize behavior patterns of the window GUI in response to subsequent mouse input events indicating drag inputs for the window GUI of the remote application.

Example 2, the method of Example 1, wherein modifying the local GUI based on a locally cached copy of the window GUI and the determined resize behavior patterns of the window GUI further comprises: performing a graphical comparison of the updated window GUI with a cached copy of the window GUI; determining the one or more resize behavior patterns of the window GUI according to the graphical comparison; and drawing resized contents of the window GUI based on the determined one or more resize behavior patterns.

Example 3, the method of Example 1, wherein determining whether the first mouse input event is associated with a window resize event for the remote application further comprises: storing an image copy of the window GUI of the remote application, transmitting a resize event to the remote application indicating a change in a first dimension; stretching the image copy along the first dimension; and receiving a resize event from the remote application containing an updated window GUI.

Example 4, the method of Example 1, further comprises receiving a final resize window event from the remote application comprising an updated window image; and redrawing the contents of the window GUI with the updated window image.

Example 5, the method of Example 1, wherein determining the one or more resize behavior patterns of the window GUI based on the graphical comparison comprises: dividing the window GUI into a plurality of block regions including a first region and a second region; determining bidirectional resize pattern for the first region of the window GUI based on the graphical comparison; and determining a static pattern for the second region of the window GUI based on the graphical comparison.

Example 6, the method of Example 5, wherein drawing resized contents of the window GUI based on the determined one or more resize behavior patterns comprises: redrawing the window GUI having the first region that is scaled according to the bidirectional resize pattern and having the second region that is scaled according to the static pattern.

Example 7, the method of Example 5, wherein at least one of the resize behavior patterns specifies that the associated block region is anchored to a window edge.

Example 8, the method of Example 5, wherein the static pattern specifies the corresponding block region remains fixed in response to a change in window size.

Example 9, the method of Example 5, wherein the bidirectional pattern specifies the corresponding block region is scaled at least one of horizontally and vertically in response to a change in window size.

Example 10, the method of Example 1, wherein the resize behavior patterns specify resizing behavior of the contents in the window GUI responsive to a change in the window size.

Figure 8:
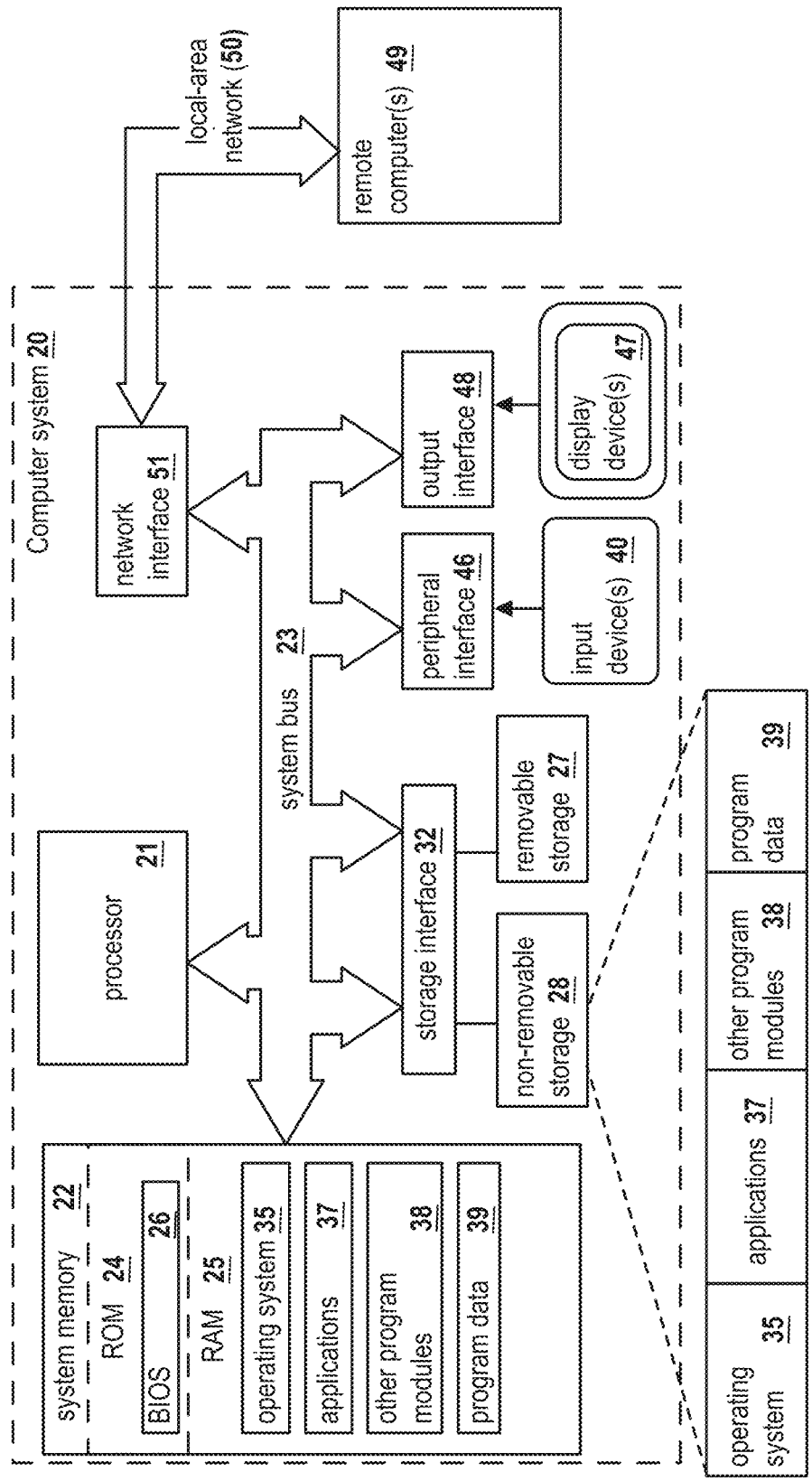
FIG. 8 is a block diagram of a computer system on which the disclosed system and method can be implemented according to an exemplary aspect.

FIG. 8 is a block diagram illustrating a computer system 20 on which aspects of systems and methods for generating a graphical user interface for a remote application may be implemented in accordance with an exemplary aspect. It should be noted that the computer system 20 can correspond to the client devices 104 and remote server 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof.

The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks;

optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 8, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method comprising:
   detecting, by a client device, a first mouse input event indicating a first window resize operation associated with a window of a remote application running on a remote server;
   responsive to transmitting the first mouse input event to the remote server, receiving a resized image of the window from the remote server and generating a window resizing pattern in dependence upon the received resized image and a locally cached copy of the window;
   responsive to detecting a second mouse input event indicating a second window resize operation, resizing the locally cached copy of the window in dependence upon the window resizing pattern; and
   rendering the resized locally cached copy of the window within a graphic user interface of the client device; wherein
   the window resizing pattern comprises:
      a bidirectional resizing pattern that specifies at least one of a horizontal scaling of the first region of the window and a vertical scaling of a first region of the window responsive to a window resize command; and
      a static resizing pattern that specifies one of another horizontal scaling of the second region of the window and another vertical scaling of a second region of the window responsive to a window resize command;
   the first region of the window comprises a central portion of the window which is resized in dependence upon the bidirectional sizing pattern;
   the second region of the window comprises edges of the window around the first region of the window which is resized in dependence upon the static resizing pattern associated with the second region of the window; and
   the one of the another horizontal scaling of the second region of the window and the another vertical scaling of the second region of the window is unity such that the second region of the window remains the same.

2. The method according to claim 1, further comprising: one of:
   responsive to detecting the first mouse input event, suspending transmission of subsequent mouse events to the remote application until detection of a third mouse input event indicating a mouse button release and establishing the third mouse input event as the second mouse input event; and
   responsive to determining that the first mouse input event is not associated with the first window resize operation for the remote application, continually transmitting subsequent mouse input events to the remote server.

3. The method according to claim 1, further comprising
   storing upon the remote server a saved image representing the window prior to detection of the first mouse input event upon the remote server;
   generating upon the remote server an updated image upon detection of the second mouse input event;
   transmitting the updated image from the remote server to the client device; and
   replacing the rendered resized local cached copy of the window upon the client device with the rendered updated image from the remote server.

4. The method according to claim 1, wherein
   the window is one of a plurality of windows within a graphical user interface of a remote session established between the remote server and the client device; and
   each window of the plurality of windows has an associated window resizing pattern and is resized according to its associated window resizing pattern upon a resizing of the graphical user interface.

5. The method according to claim 1, wherein
   the window is one of a plurality of windows within a graphical user interface of a remote session established between the remote server and the client device; and
   each window of the plurality of windows is resized according to the window resizing pattern upon a resizing of the graphical user interface.

6. The method according to claim 1, wherein
   the window resizing pattern comprises at least one of:
      a bidirectional resizing pattern associated with a first region of the window; and
      a static resizing pattern associated with a second region of the window; and
   the window is a graphical user interface of a remote session established between the remote server and the client device by the remote application;
   the graphical user interface comprises a plurality of other windows;
   the plurality of other windows within the window each have an associated window resizing pattern; and
   subsequent resizing operations of the window and its plurality of other windows are performed in dependence upon the window resizing patterns associated with the plurality of other windows.

7. The method according to claim 1, wherein
   resizing the locally cached copy of the window based on the bidirectional resizing pattern and the static resizing pattern associated with the window comprises:
      dividing the image into a plurality of blocks in dependence upon metadata information relating to window content of the window; and
      associating each block of the plurality of blocks with one of the first region and the second region in dependence upon the metadata information for that block of the plurality of blocks; and
   the metadata information is obtained from a remote desktop session upon the remote server associated with the remote application.

8. The method according to claim 1, further comprising
   generating upon the remote server an updated image upon detection of the second mouse input event by resizing a saved image of the window stored upon the remote server;
   transmitting the updated image from the remote server to the client device; and
   replacing the rendered resized local cached copy of the window upon the client device with the rendered updated image from the remote server; wherein
   resizing the saved window comprises:
      dividing the image into a plurality of blocks in dependence upon metadata information relating to window content of the window; and
      associating each block of the plurality of blocks with one of the first region and the second region in dependence upon the metadata information for that block of the plurality of blocks;
      scaling each block of the plurality of blocks associated with first region in dependence upon the bidirectional resizing pattern; and scaling each block of the plurality of blocks associated with second region in dependence upon the static resizing pattern associated;

the metadata information is obtained from a remote desktop session upon the remote server associated with the remote application; and the saved image of the window represents the window prior to detection of the first mouse input event upon the remote server.

9. The method according to claim 1, wherein resizing the locally cached copy of the window comprises:

dividing the image into a plurality of blocks in dependence upon metadata information relating to window content of the window;

associating each block of the plurality of blocks with one of a first window region of the plurality of first window regions and a second window region of the plurality of second window regions in dependence upon the metadata information for that block of the plurality of blocks;

resizing each block of the plurality of blocks in dependence upon its associated resizing pattern; and the metadata information is obtained from a remote desktop session upon the remote server associated with the remote application.

10. The method according to claim 1, wherein resizing the saved window comprises:

dividing the image into a plurality of blocks in dependence upon metadata information relating to window content of the window;

associating each block of the plurality of blocks with one of the first region and the second region in dependence upon a block size of the block of the plurality of blocks established during the comparison of the resized image with the locally cached copy of the window by comparing the corresponding block of the plurality of blocks within the resized image and the locally cached copy of the image; and resizing each block of the plurality of blocks in dependence upon its associated resizing pattern; and the metadata information is obtained from a remote desktop session upon the remote server associated with the remote application.

\* \* \* \* \*